(12) United States Patent
Zhang et al.

(10) Patent No.: US 12,506,151 B2
(45) Date of Patent: Dec. 23, 2025

(54) ANODE MATERIAL AND BATTERY (71) Applicant: BTR NEW MATERIAL GROUP CO., LTD., Guangdong (CN)

(72) Inventors: Meng Zhang, Guangdong (CN); Mengyang Zu, Guangdong (CN); Zikun Li, Guangdong (CN); Jian Huang, Guangdong (CN); Jianguo Ren, Guangdong (CN)

(73) Assignee: BTR NEW MATERIAL GROUP CO., LTD., Guangdong (CN)

( * ) Notice: Subject to any disclaimer, the term of this patent is extended or adjusted under 35 U.S.C. 154(b) by 0 days.

(21) Appl. No.: 18/690,987

(22) PCT Filed: Jun. 28, 2023

(86) PCT No.: PCT/CN2023/103378
§ 371 (c)(1),
(2) Date: Mar. 11, 2024

(87) PCT Pub. No.: WO2025/000285
PCT Pub. Date: Jan. 2, 2025

(65) Prior Publication Data
US 2025/0183302 A1 Jun. 5, 2025

(51) Int. Cl.
*H01M 4/587* (2010.01)
*C01B 32/205* (2017.01)
*H01M 4/02* (2006.01)

(52) U.S. Cl.
CPC .......... *H01M 4/587* (2013.01); *C01B 32/205* (2017.08); *C01P 2004/61* (2013.01);
(Continued)

(58) Field of Classification Search
CPC .......... H01M 4/587; H01M 2004/021; H01M 2004/027; C01B 32/205; C01P 2004/61;
(Continued)

(56) References Cited

U.S. PATENT DOCUMENTS

2008/0274406 A1   11/2008   Fuse et al.
2010/0086856 A1*  4/2010    Matsumoto ........... H01M 4/587
                                                    252/182.1
(Continued)

FOREIGN PATENT DOCUMENTS

CN    1851963 A      10/2006
CN    110828824 A    2/2020
(Continued)

OTHER PUBLICATIONS

Machine translation of CN 11082882, retrieved from <www.espacenet.com> on Sep. 4, 2025.*
(Continued)

*Primary Examiner* — Cynthia K Walls
(74) *Attorney, Agent, or Firm* — McCoy Russell LLP (57) ABSTRACT

The present disclosure relates to an anode material and a battery, the anode material comprises graphite, an interior and/or a surface of the graphite has pores, a pore volume of the anode material is V (cm3/kg), a specific surface area is S (m2/g), a tap density is T (g/cc), wherein, $2 \leq V*S/T \leq 10$. By constructing the ratio relationship of the specific surface area, the pore volume and the tap density of the anode material, the overall distribution condition of defects such as pore pathways, crystal lattices and micro cracks in the graphite particles can be reflected, and within the limited range, the defect distribution in the anode material is uniform, and the uniformly distributed defect structure can reduce the expansion of the graphite anode material in the charging and discharging process, and improve electrical performance and processability.

9 Claims, 1 Drawing Sheet

(52) U.S. Cl.
CPC ....... *C01P 2006/11* (2013.01); *C01P 2006/12* (2013.01); *C01P 2006/14* (2013.01); *C01P 2006/17* (2013.01); *C01P 2006/40* (2013.01); *H01M 2004/021* (2013.01); *H01M 2004/027* (2013.01)

(58) Field of Classification Search
CPC .............. C01P 2006/11; C01P 2006/12; C01P 2006/14; C01P 2006/17; C01P 2006/40
See application file for complete search history.

(56) References Cited

U.S. PATENT DOCUMENTS

| | | | |
|---|---|---|---|
| 2013/0280601 A1* | 10/2013 | Geramita | H01M 4/36 521/181 |
| 2015/0283534 A1* | 10/2015 | Costantino | B01J 20/28073 585/16 |
| 2016/0204420 A1* | 7/2016 | Toulis | H01M 4/366 427/113 |
| 2021/0167398 A1 | 6/2021 | Choi et al. | |
| 2021/0313575 A1 | 10/2021 | Shen et al. | |
| 2022/0293942 A1 | 9/2022 | Matsumoto et al. | |

FOREIGN PATENT DOCUMENTS

| | | |
|---|---|---|
| CN | 111740082 A | 10/2020 |
| CN | 110828824 B | 6/2021 |
| CN | 114843508 A | 8/2022 |
| CN | 115377393 A | 11/2022 |
| CN | 115881952 A | 3/2023 |
| CN | 115954472 A | 4/2023 |
| CN | 116057734 A | 5/2023 |
| JP | 2000348726 A | 12/2000 |
| JP | 2013008526 A | 1/2013 |
| JP | 2014067680 A | 4/2014 |
| JP | 2014186956 A | 10/2014 |
| JP | 2016085906 A | 5/2016 |
| JP | 2019145529 A | 8/2019 |
| KR | 20210079730 A | 6/2021 |
| KR | 20220006005 A | 1/2022 |
| WO | 2016006617 A1 | 1/2016 |

OTHER PUBLICATIONS

State Intellectual Property Office of the People's Republic of China, Office Action and Search Report Issued in Application No. 202380009569.1, May 25, 2024, 14 pages.

Korean Intellectual Property Office, Office Action Issued in Application No. 10-2024-7008065, Feb. 5, 2025, 14 pages.

European Patent Office, Extended European Search Report Issued in Application No. 23861711.2, Apr. 30, 2025, Germany, 7 pages.

State Intellectual Property Office of the People's Republic of China, Office Action and Search Report Issued in Application No. 202411496105.0, Jul. 12, 2025, 16 pages. (Submitted with Partial Translation).

State Intellectual Property Office of the People's Republic of China, Office Action and Search Report Issued in Application No. 202411554971.0, Jun. 18, 2025, 18 pages.

Japanese Patent Office, Office Action Issued in Application No. 2024-513860, Jun. 20, 2025, 6 pages.

State Intellectual Property Office of the People's Republic of China, Office Action and Search Report Issued in Application No. 202411551658.1, Jul. 22, 2025, 16 pages. (Submitted with Partial Translation).

* cited by examiner

US 12,506,151 B2

ANODE MATERIAL AND BATTERY

CROSS REFERENCE TO RELATED APPLICATION

The present application is a U.S. National Phase of International Application No. PCT/CN2023/103378 entitled "ANODE MATERIAL AND BATTERY," and filed on Jun. 28, 2023. The entire contents of the above-listed application are hereby incorporated by reference for all purposes.

TECHNICAL FIELD

The present disclosure belongs to the technical field of anode materials, and particularly relates to an anode material and a battery.

BACKGROUND

Graphite anode materials become the most mature anode materials at present due to factors such as wide sources, rich reserves, stable electrochemical performance, and close actual specific capacity density to theoretical specific capacity.

For a graphite anode material, a special layered structure of graphite determines that $Li^+$ can only be embedded from the end plane of the material and gradually diffused into particles, resulting in a low diffusion rate of lithium ions and a poor rate performance, and a prepared negative electrode sheet is prone to lithium precipitation, thereby causing safety problems such as short circuit and thermal runaway of a battery, therefore, a structure of a graphite material needs to be improved to enhance a diffusion pathway of the lithium ions, and it is known by those skilled in the art that an ideal structure of the graphite material is formed by orderly arranging six-membered rings composed of carbon atoms, and people generally want to influence the pore volume and specific surface area of the graphite anode material by adjusting the size of pores, thereby affecting the electrochemical performance of the graphite material. The pores and cracks on the graphite surface are improved through the coating layer. However, Applicant found: In a real application process, graphite has different defect structures in the macroscopic and microscopic levels, simply adjust the size and structure of the pores for the anode material multiplier performance enhancement is limited, and the demand of people for higher and higher performance of graphite materials cannot be met.

Therefore, at the current stage when graphite materials are already well developed, it is necessary to further study the graphite anode material to maximize the rate performance of graphite.

SUMMARY

In order to overcome the above defects, the present disclosure provides an anode material and a battery, which can improve active sites and diffusion pathways for lithium ion deintercalation in the anode material, and facilitate improving the rate performance and processability of the anode material.

In a first aspect, an embodiment of the present disclosure provides an anode material, the anode material includes graphite, an interior and/or a surface of the graphite have a pore, and a pore volume V ($cm^3$/kg), a specific surface area S ($m^2$/g), and a tap density T (g/cc) of the anode material satisfy: $2 \leq V*S/T \leq 10$;

The pore volume is tested by using ASAP2460 device from American Micromeritics, and calculated in the pore size range of 17 Å to 3000 Å by a model of BJH Desortation cumulative volume of pores model.

In some embodiments, the particle size of the anode material satisfies the following relational expressions: $0.9 \leq (D90-D10)/D50 \leq 1.8$, and 10 μm $\leq D50 \leq$ 20 μm.

In some embodiments, D90 of the anode material is 25 μm to 36 μm.

In some embodiments, D10 of the anode material is 7 μm to 9 μm.

In some embodiments, a pore volume of the anode material is 2 $cm^3$/kg to 6 $cm^3$/kg.

In some embodiments, a specific surface area of the anode material is 1.0 $m^2$/g to 2.0 $m^2$/g.

In some embodiments, a tap density of the anode material is 0.85 g/cc to 1.40 g/cc.

In some embodiments, the anode material includes artificial graphite primary particles and/or artificial graphite secondary particles.

In some embodiments, the pores include at least one of micro-pores and meso-pores.

In some embodiments, the average size of the pores is 80 Å to 125 Å.

In a second aspect, an embodiment of the present disclosure provides a battery, the battery includes the anode material according to the first aspect.

The technical solution of the present disclosure has at least the following beneficial effects:

Those skilled in the art know that the pore volume within a certain range of artificial graphite can enhance the diffusion of $Li^+$, and the specific surface area within a certain range can ensure a sufficient electrochemical reaction interface, promote the diffusion of lithium ions at the solid-liquid interface and in the solid phase, reduce the concentration polarization, and contribute to the improvement of the capacity and rate performance of the anode material. On this basis, the applicant has found through deep research that the comprehensive performance of the anode material does not necessarily reach the optimal and most stable effect when only enough pore volume and specific surface area are met, graphite as the anode material not only needs pore and surface structures to provide a diffusion pathway and a reaction interface with sufficient lithium ion deintercalation to obtain good electrochemical performance, but also needs the pole piece to have good processability, so that the battery can reach an ideal energy density and keep the structure of pole piece stable in the cycle process. The applicant believes that other structures such as pores, particle surfaces and crystal planes of graphite that disrupt the arrangement of the graphite six-membered rings can be considered to be defects of an ideal graphite structure and are present in the graphite particles, therefore, by reasonably controlling the defects will not only not reduce the performance of the graphite material cannot, but also will enhance the electrical performance of the material to a certain extent. In order to obtain an optimal graphite defect structure, it is necessary to accurately adjust the overall structure distribution of defects such as particle surface, pores, crystal lattice of graphite and the like, and through analysis, it is considered that the present disclosure performs a large amount of experimental exploration by combining three factors of pore volume, specific surface area and tap density of a graphite material, and controls V*S/T of an anode material within a range of 2 to 10, which represents that on the basis of ensuring the processability of the anode material, the advantage of enhancing the lithium ion diffusion rate caused by abundant overall structure defects of the material is fully exerted, and finally the purpose of improving the high-rate charge/discharge performance of the artificial graphite anode material is achieved.

BRIEF DESCRIPTION OF DRAWINGS

The following further describes the present disclosure with reference to the accompanying drawings and embodiments.

DESCRIPTION OF EMBODIMENTS

In order to better understand the technical solutions of the present disclosure, embodiments of the present disclosure are described in detail as follows with reference to the accompanying drawings.

It is to be made clear that the described embodiments are only some rather than all of the embodiments of the present disclosure. All other embodiments obtained by those of ordinary skill in the art based on the embodiments in the present disclosure without creative efforts fall within the protection scope of the present disclosure.

The terms used in the embodiments of the present disclosure are only for the purpose of describing specific embodiments, and are not intended to limit the present disclosure. The singular forms of "a", "said" and "the" used in the embodiments of the present disclosure and the appended claims are also intended to include the plurality form, unless the context clearly indicates other meanings.

It will be understood that the term "and/or" as used herein is merely an associative relationship that describes associated objects, that there may be three relationships, e. g., A and/or B, which may mean that A alone is present, while both A and B are present, B alone is present, three of which exist alone. In addition, the character "/" herein generally means an "or" relationship between the associated objects.

For the graphite anode material, the graphite material needs to be prepared into slurry in the use process and further coated on a copper foil current collector for use, and a good electrode structure is maintained in the long cycle process, therefore, the graphite anode material is required to have good processability; meanwhile, since lithium ions in the lithium deintercalation process of graphite can only enter the graphite interlayers from the end plane, the diffusion pathway is limited, so that the diffusion of the lithium ions at the solid-liquid interface and in the solid phase is limited, and the development of the high-rate charge/discharge performance of the graphite is further limited. Generally speaking, artificial graphite has a certain number of pore structures, on one hand, the presence of pores can increase the diffusion of $Li^+$ in the graphite material, thereby effectively improving the rate performance of the material; on the other hand, too many pore structures will cause the specific surface area of the material to be too large, which not only causes the volume density of the graphite to be reduced, but also causes the pores are present on the surface to cause the particle surfaces to be more uneven and rough, and the fluidity of the graphite particles is poor, which finally causes the tap density of the graphite material to be reduced, thereby worsen the processability and the electrochemical performance such as the initial efficiency and the cycle of the product. In fact, the comprehensive performance of the graphite anode material is not optimal by simply improve the pore structure, there is still a lot can be improved. The researchers mostly stay in the exploration of the influence of a single factor on the performance of the graphite material, and do not carry out deep research from the synergistic angle of various factors to maximize the improvement of rate performance of graphite.

Therefore, at the present stage where the graphite material has been developed to be very mature, the single improvement of one parameter cannot meet the requirements of the market for low-cost and high-performance graphite materials, and it is necessary to explore the action mechanism of multiple factors synergistically to develop a graphite anode material meeting the market requirements.

Hereinafter, one of the preparation processes developed by the applicant is taken as an example to further describe the preparation process and related products in detail.

An embodiment of the present disclosure provides a method for preparing an anode material, including the following steps:

S10: mixing the carbon-based raw material, the pore-forming agent and the binder to obtain a first precursor, wherein a particle size of the pore-forming agent satisfies $0.5 \leq (D90-D10)/D50 \leq 0.8$, $5$ nm $\leq D50 \leq 8$ nm, and a mass ratio of the carbon-based raw material, the pore-forming agent and the binder is (70 to 94):(1 to 10):(5 to 20).

S20: performing a first heat treatment on the first precursor to carbonize the first precursor to obtain a second precursor.

S30: performing a second heat treatment on the second precursor to graphitize the second precursor to obtain an anode material, wherein the second heat treatment comprises: firstly, heating to 1600° C. to 1800° C. according to the heating rate of 2° C./min to 5° C./min, then heating to 3000° C. to 3200° C. according to the heating rate of 2° C./min to 8° C./min, holding the temperature for 6 h to 10 h, cooling to 800° C. according to the cooling rate of 0.1° C./min to 0.5° C./min after holding the temperature, and finally cooling to ordinary temperature according to the cooling rate of 2° C./min to 4° C./min.

According to the present disclosure, the carbon-based raw material, the pore-forming agent with the specific particle size and the particle size distribution and the binder are mixed in a proper proportion, then carbonized and graphitized, and the pore-forming agent is uniformly and rapidly separated by controlling the heating rate and the cooling rate of the carbonization process, the graphitization process and the graphitization holding time, so that more lithium ion diffusion pathways are created for the interior of the graphite material, the purpose of regulating the defect structure and the surface morphology of the graphite anode material is achieved, the tap density, the pore and the specific surface area parameters of the graphite anode material are optimized, and finally the processability and the rate performance of the graphite anode material are effectively improved. The method is simple, the production cost is low, and the prepared graphite anode material has the characteristics of high tap density, good processability, excellent rate performance and the like, and can meet the use requirements of power batteries and energy storage clients.

The preparation method of the present disclosure is described in detail below:

S10: mixing the carbon-based raw material, the pore-forming agent and the binder to obtain a first precursor, wherein a particle size of the pore-forming agent satisfies $0.5 \leq (D90-D10)/D50 \leq 0.8$, $5$ nm $\leq D50 \leq 8$ nm, and a mass ratio of the carbon-based raw material, the pore-forming agent and the binder is (70 to 94):(1 to 10):(5 to 20).

In some embodiments, the carbon-based raw material needs to be shaped to obtain a carbon-based raw material with a specific particle size before the carbon-based raw material, the pore forming agent and the binder are mixed.

In some embodiments, the particle size of the shaped carbon-based raw material is 10 μm to 25 μm, for example, 10 μm, 12 μm, 15μ, 18 μm, 20 μm, 22 μm, 25 μm, or the like, and may also be other values within the above range, which is not limited herein.

In some embodiments, the carbon-based raw material includes at least one of petroleum coke, needle coke, pitch coke, and Gilsonite coke.

In some embodiments, the pore-forming agent includes at least one of silicon oxide and silicon carbide.

In some embodiments, a particle size of the pore-forming agent satisfies 0.5≤(D90−D10)/D50≤0.8, and 5 nm≤D50≤8 nm. Specifically, a value of (D90−D10)/D50 may be 0.5, 0.6, 0.7, 0.8, or the like, and may also be other values within the above range, which is not limited herein. The median particle diameter D50 of the pore-forming agent may be 5 nm, 6 nm, 7 nm or 8 nm, or the like, and may also be other values within the above range, which is not limited herein. Within the above limited range, it indicates that the pore-forming agent has a small and concentrated particle size, which is beneficial for the pore-forming agent to uniformly and rapidly escape from the carbon-based raw material in the graphitization process, and form a uniform and controllable pore defect structure in the final graphite anode material as a lithium ion diffusion pathway.

In some embodiments, the binder includes at least one of coal pitch, petroleum pitch, petroleum resin, phenolic resin, epoxy resin, coumarone resin, and furan resin.

In some embodiments, the mass ratio of the carbon-based raw material, the pore-forming agent and the binder is (70 to 94):(1 to 10):(5 to 20), for example, the mass ratio of the carbon-based raw material, the pore-forming agent and the binder may be 70:10:20, 75:8:17, 80:5:15, 85:3:12 or 94:1:5, or the like, and certainly, and may also be other values within the above range, which is not limited herein. If the added amount of the pore-forming agent is greater than the limited range of the present disclosure, the specific surface area of the material is easily increased, and meanwhile, the tap density of the graphite material is reduced, thereby causing deterioration of the electrochemical performance and the processability, such as the initial efficiency and the cycle of the product; if the added amount of the pore-forming agent is less than the limited range of the present disclosure, the pore structure formed is too small to achieve the purpose of creating more lithium ion diffusion pathways and electrochemical reaction interfaces for the anode material, meanwhile, in the graphitization process, the pore-forming agent is equivalent to impurities in the carbon raw material, which may affect the crystallization of graphite polycrystals, and further affect the distribution of crystal lattice and crystal plane defects of the graphite material. It can be understood that when the added amount of the binder is less than the limited range of the present disclosure, (the mass ratio of the carbon-based raw material to the binder is greater than 94:5), the obtained artificial graphite is mainly primary particles, and when the ratio of the binder is relatively high (the mass ratio of the carbon-based raw material to the binder is less than or equal to 85:12), the obtained artificial graphite is mainly secondary particles.

S20: performing a first heat treatment on the first precursor to carbonize the first precursor to obtain a second precursor.

In some embodiments, the temperature of the first heat treatment is 800° C. to 1100° C., for example, the temperature of the first heat treatment may be 800° C., 900° C., 1000° C., 1100° C., or the like, and certainly, and may also be other values within the above range, which is not limited herein.

In some embodiments, the holding time of the first heat treatment is 4 h to 10 h, for example, which may be 4 h, 5 h, 6 h, 7 h, 8 h, 9 h or 10 h, or the like, and may also be other values within the above range, which is not limited herein.

In some embodiments, the heating rate of the first heat treatment is 2° C./min to 10° C./min, for example, which may be 2° C./min, 3° C./min, 4° C./min, 5° C./min, 6° C./min, 7° C./min, 8° C./min, 9° C./min or 10° C./min, or the like, and may also be other values within the above range, which is not limited herein.

In some embodiments, the cooling rate after the first heat treatment is 1° C./min to 5° C./min, for example, which may be 1° C./min, 2° C./min, 3° C./min, 4° C./min or 5° C./min, or the like, and may also be other values within the above range, which is not limited herein.

In some embodiments, the first heat treatment is performed under a protective atmosphere, the protective atmosphere including at least one of nitrogen, helium, neon, argon, krypton, and xenon.

In the first heat treatment process, a carbon-based raw material in a first precursor undergoes pyrolysis shrinkage conversion into a carbon solid arranged in microcrystals, organic matter molecules and impurities are present in the carbon-based raw material, a pore-forming agent and a binder slowly escape to form a pore structure in the heating process, and in the first precursor of the pore-forming agent with a specific particle size, pores and surfaces distributed in a specific structure are formed in the carbon solid by controlling the time, temperature and temperature rise rate of the first heat treatment, structural defects beneficial to uniform distribution of lithium ion diffusion are formed, and excellent reaction raw materials are provided for subsequent second heat treatment graphitization.

S30: performing a second heat treatment on the second precursor to graphitize the second precursor, wherein the second heat treatment includes: heating a second precursor to 1600° C. to 1800° C. within 6 h to 10 h, the heating rate is 2° C./min to 5° C./min; heating to 3000° C. to 3200° C. within 4 h to 6 h, the heating rate is 2° C./min to 8° C./min; holding the temperature for 6 h to 10 h, cooling to 800° C. after holding the temperature for 150 h to 200 h, the cooling rate is 0.1° C. to 0.5° C.; and cooling to ordinary temperature within 4 h to 6 h, the cooling rate is 2° C./min to 4° C./min to obtain the anode material.

The heating rate, the cooling rate and the holding time of the second heat treatment are controlled within the above range, which is beneficial for the pore-forming agent to uniformly and rapidly decompose and escape from the material in the graphitization process of the second precursor, creating more lithium ion diffusion pathways for the interior of the graphite material, and the graphite crystal structure is mostly polycrystalline, and crystal plane defects are present between grain boundaries; meanwhile, the above control can also maintain a highly regular crystal structure, so as to achieve the purpose of regulating the structure and morphology of the graphite negative electrode, optimize the tap density, pores and specific surface area parameters of the product, and improve the processability and rate performance of the anode material.

Those skilled in the art will understand that the preparation method of the battery described above is only an embodiment. Other methods commonly used in the art can be employed without departing from the scope of the present disclosure.

The disclosure provides an anode material, the anode material includes graphite, an interior and/or a surface of the graphite have a pore, and a pore volume V (cm³/kg), a specific surface area S (m²/g), and a tap density T (g/cc) of the anode material satisfy: $2 \leq V*S/T \leq 10$;

The pore volume is tested by using ASAP2460 device of American Micromeritics, and calculated in a pore size range of 17 Å to 3000 Å by a model of BJH Desortation cumulative volume of pores model.

In the above solution, the anode material provided by the present disclosure is prepared by adding a binder and a pore-forming agent with a specific particle size into a carbon-based raw material, and then performing carbonization and graphitization heating processes at a specific heating rate and cooling rate, so that the pore-forming agent forms specific pores inside and/or on the surface of the graphite, and the distribution of the pores can reflect the distribution of defect structures in the graphite polycrystal to a certain extent, because the specific pore structure distribution is present inside the graphitized material, these pore structure defects are mainly derived from the phenomena such as volatilization of organic matter, pore-forming agent, carbon source pyrolysis shrinkage and polycrystalline orientation that cause uneven internal stress, and finally, the inside/surface of the graphite exhibits the morphology of different pores such as close pores, open pores, interlayer microcracks and pore pathways, thereby achieving accurate control of the inside and/or surface defects of the graphite, and enabling the pore volume, specific surface area and tap density of the material to meet ideal regulation design requirements. Wherein, uniformly distributed pore defects are formed inside and/or on the surface of the graphite, and the uniformly distributed pores can reduce the expansion of the graphite anode material during charging and discharging. In addition, the pore defect can be used as an additional lithium storage space to improve the lithium storage capacity of the anode material and increase the specific surface area. When the anode material is made into the electrode to be applied to the battery, after the electrolyte is injected, pores in the artificial graphite particles are filled with the electrolyte, and when charging and discharging are carried out, electrochemical reaction occurs in the electrode, pore defects on the surface and the interior of the graphite particles and the outer surface of the exposed graphite particles due to uneven stress at the defects create more lithium ion diffusion pathways and electrochemical reaction interfaces for the anode material under proper tap, can promote diffusion of lithium ions in a solid-liquid interface and a solid phase, reduce concentration polarization, and improve the capacity and rate performance of the anode material. In addition, the anode material provided by the disclosure has good processability, can prevent the graphite sheet layer from falling off in the cycle process of the graphite anode material, and is beneficial to improving the cycle performance of the material.

Generally speaking, the pore volume within a certain range in graphite can increase the diffusion pathway of Li ions, and the specific surface area within a certain range can ensure a sufficient electrochemical reaction interface, promote the diffusion of lithium ions in the solid-liquid interface and the solid phase, reduce concentration polarization, and facilitate improving the capacity and rate performance of the anode material. However, the pore distribution of the material is disordered, the specific surface area is increased, which limits the improvement of the rate performance and the processability of the graphite anode material, therefore, single improvement of the pores structures does not lead to optimal and stable electrochemical performance of graphite anode materials. Therefore, by controlling the V*S/T of the graphite anode material within the above range, the anode material with better comprehensive performance such as rate performance and cycle performance can be obtained on the basis of maintaining good processability. In this disclosure, a value range of V*S/T is 2 to 10, for example, may be 2, 2.5, 3, 3.6, 4, 4.5, 5, 5.3, 6, 6.7, 7, 7.3, 8, 8.4, 9, 9.5, 10, or the like, and may also be other values within the above range, which is not limited herein. In the above formula, V is the pore volume of the graphite material, S is the specific surface area of the graphite material, and T is the tap density of the graphite material. The larger the V, the richer the pore structure of the graphite particle, the larger the specific surface area S within a certain range, but the lower the initial efficiency of the graphite anode material, and the worse the cycle performance; the smaller the T, the poor the processability of the graphite as the anode material in the process of preparing the slurry and the electrode, that is, the rate performance and the processability of the graphite anode material cannot be improved by a single factor, and the improvement of the rate performance of the material by controlling a single factor is limited. Therefore, in the present disclosure, the use of the V*S/T combination parameter in this application allows for a combination of both of the two factors, and it is thought that although close pores cannot be accurately measured, they can still provide rich pathways for lithium ions, due to the effect of defect stress, micro-cracks easily occur around the close pores and at the grain boundary, both are potential fracture sources inside the material, when the material is crushed, the graphite particles will be impacted and crushed preferentially at the position where the defect stress is large with micro-cracks, at this time, the inner close pore part will be opened and exposed to the surface, or after the inner deep open pore pathway is exposed to form the outer surface of the graphite particles, the surface of the material is finally rough; meanwhile, the grain boundary defects of part of the graphite polycrystal may also be exposed by stress splitting, the surface of the grain boundary defects is relatively smooth, therefore, the comprehensive state of the above two surface defects will affect the fluidity of the graphite particles, and finally the applicant finds that the comprehensive structural state of the graphite internal/surface defects can be reflected to a certain extent by using the relationship between the tap, the specific surface area and the pore volume, and the V*S/T is controlled to be 2 to 10, so that the better rate performance and processability can be obtained at the same time, preferably, the value range of V*S/T is 2.5 to 8.4.

In some embodiments, the particle size of the anode material satisfies the following relational expression: $0.9 \leq (D90-D10)/D50 \leq 1.8$, and $10 \ \mu m \leq D50 \leq 20 \ \mu m$. In the above formula, D90 is the particle size at the cumulative distribution of material particles is 90%, D10 is the particle size at the cumulative distribution of material particles is 10%, and D50 is the particle size at the cumulative distribution of material particles is 50%, also referred to as the median particle size.

An ideal battery material needs to have a narrow particle size distribution, and research shows that excessive fine powder will cause the deterioration of capacity retention rate caused by the continuous consumption of electrolyte in the cycle of the battery material with too high activity, and large particles with larger expansion tend to cause particle pulverization in the cycle, which tends to cause continuous thickening of SEI. Therefore, by narrowing the particle size distribution, the cycle performance of the material can be improved. In the anode material of the present disclosure, (D90−D10)/D50 is between 0.9 and 1.8, and D50 is between 10 μm and 20 μm, indicating that the particle size span of the anode material is relatively small, that is, the anode material has relatively uniform particle size distribution, so that the material can avoid the above problems, and further has a relatively high bulk density, which facilitates improving the electrochemical performance of the anode material. For example, a value of (D90−D10)/D50 may be 0.9, 1.0, 1.1, 1.2, 1.3, 1.4, 1.5, 1.6, 1.7, 1.8, or the like, and may also be other values within the above range, which is not limited herein. If (D90−D10)/D50 is less than 0.9, it indicates that the particle size distribution of the anode material is too narrow, which is not beneficial to the coating of the anode material for preparing the pole piece, resulting in poor processability; if (D90−D10)/D50 is greater than 1.8, it indicates that the anode material has more fine powder, which is not beneficial to the improvement of the cycle performance of the anode material.

In some embodiments, the median particle diameter D50 of the anode material, for example, may be 10 μm, 11 μm, 12 μm, 13 μm, 14μ, 15 μm, 16 μm, 17 μm, 18μ, 19 μm, 20 μm, or the like, and certainly, or the like, and may also be other values within the above range, which is not limited herein.

In some embodiments, the D90 of the anode material is 25 μm to 36 μm, for example, may be 25 μm, 28 μm, 30 μm, 32 μm, 35 μm or 36 μm, or the like, and may also be other values within the above range, which is not limited herein.

In some embodiments, the D10 of the anode material is 7 μm to 9 μm, for example, may be 7 μm, 7.5 μm, 8 μm, 8.5 μm, 9 μm, or the like, and may also be other values within the above range, which is not limited herein.

In some embodiments, the pore volume of the anode material is 2 cm$^3$/kg to 6 cm$^3$/kg, for example, the pore volume of the anode material is 2 cm$^3$/kg, 3 cm$^3$/kg, 4 cm$^3$/kg, 5 cm$^3$/kg or 6 cm$^3$/kg, or the like, and may also be other values within the above range, which is not limited herein. In the above range, it shows that the graphite anode material has a suitable pore structure, and can effectively provide sufficient pathways for lithium ion diffusion, which is beneficial to improving the rate performance of the anode material.

In some embodiments, the specific surface area of the anode material is 1.0 m$^2$/g to 2.0 m$^2$/g, for example, the specific surface area of the anode material may be 1.0 m$^2$/g, 1.1 m$^2$/g, 1.2 m$^2$/g, 1.3 m$^2$/g, 1.4 m$^2$/g, 1.5 m$^2$/g, 1.6 m$^2$/g, 1.7 m$^2$/g, 1.8 m$^2$/g, 1.9 m$^2$/g or 2.0 m$^2$/g, or the like, and may also be other values within the above range, which is not limited herein. Within the above range, the anode material has abundant surface active sites, which is also beneficial to improving the rate performance of the material.

In some embodiments, the tap density of the anode material is 0.85 g/cc to 1.40 g/cc, for example, the tap density of the anode material may be 0.85 g/cc, 1.0 g/cc, 1.10 g/cc, 1.20 g/cc, 1.30 g/cc, 1.40 g/cc, or the like, and may also be other values within the above range, which is not limited herein. In the above range, it shows that the anode material has good processability, which reduces the difficulty of coating the pole piece and manufacturing the battery, and also facilitates maintaining the structure stability of the pole piece in the cycle process and improving the cycle performance of the material and the energy density of the battery.

In some embodiments, the specific capacity of the anode material is 330 mAh/g to 370 mAh/g. For example, the specific capacity of the anode material may be 330 mAh/g, 340 mAh/g, 350 mAh/g, 360 mAh/g, 370 mAh/g, or the like, and may also be other values within the above range, which is not limited herein.

In some embodiments, the pores include at least one of micro-pores and meso-pores.

In some embodiments, the average pore diameter of the pores is 80 Å to 125 Å; for example, may be 80 Å, 90 Å, 100 Å, 110 Å, 120 Å or 150 Å, or the like, and may also be other values within the above range, which is not limited herein.

An embodiment of this disclosure further provides a battery, the battery includes the anode material.

Those skilled in the art will understand that the preparation method of the battery described above is only an embodiment. Other methods commonly used in the art can be used without departing from the scope of the present disclosure, and other types of batteries can further be prepared for testing, such as sodium ion batteries and potassium ion batteries.

The present disclosure is further described below through multiple embodiments. The embodiments herein are not limited to the specific embodiments described below. Variations may be made appropriately without changing the scope of the independent claims.

Embodiment 1

(1) The petroleum coke raw material was crushed, and the median particle size of the crushed material powder was less than 20 μm.

(2) The powder obtained in step (1), the nano silicon oxide pore-forming agent and the coal pitch binder was uniformly mixed to obtain a first precursor, wherein the mass ratio of the petroleum coke, the pore-forming agent and the binder was controlled to be 70:10:20, and D50 of the pore-forming agent was 8 nm, (D90−D10)/D50=0.5;

(3) The first precursor obtained in step (2) was carbonized at 1000° C. to obtain a second precursor;

(4) The second precursor obtained in step (3) was graphitized at a high temperature of 3000° C., and the temperature rise and fall curve was controlled as follows: The temperature was increased to 1800° C. (the heating rate was 3° C./min) in 10 h, the temperature was increased to 3000° C. (the heating rate was 3.3° C./min) in 6 h, the temperature was held for 6 h, the temperature was reduced to 800° C. (the cooling rate was 0.3° C./min) in 150 h after the temperature was held, and then the temperature was reduced to ordinary temperature (the cooling rate was 2.2° C./min) in 6 h;

(5) The material obtained in step (4) was crushed, screened and mixed to finally obtain a graphite anode material with D50 of 10 μm to 20 μm.

The anode material includes primary particle artificial graphite and secondary particle artificial graphite, mainly is the secondary particle artificial graphite. The data of pore volume, tap density and specific surface area of the anode material are shown in Table 1.

Embodiment 2

This Embodiment differs from Embodiment 1 in that, the temperature rise and fall curve used in step (4) is as follows: The temperature was increased to 1800° C. (the heating rate was 3.8° C./min) in 8 h, the temperature was increased to 3000° C. (the heating rate was 4° C./min) in 5 h, the temperature was held for 8 h, the temperature was reduced to 800° C. (the cooling rate was 0.2° C./min) in 170 h after the temperature was held, and then the temperature was reduced to ordinary temperature (the cooling rate was 2.7° C./min) in 5 h to obtain the graphite anode material.

In this embodiment, the anode material includes primary particle artificial graphite and secondary particle artificial graphite, mainly is the secondary particle artificial graphite, and the data of pore volume, tap density and specific surface area of the anode material are shown in Table 1.

Embodiment 3

This Embodiment differs from Embodiment 1 in that, the temperature rise and fall curve used in step (4) is as follows: The temperature was increased to 1800° C. (the heating rate was 5° C./min) in 6 h, the temperature was increased to 3200° C. (the heating rate was 4.7° C./min) in 5 h, the temperature was held for 10 h, the temperature was reduced to 800° C. (the cooling rate was 0.2° C./min) in 190 h after the temperature was held, and then the temperature was reduced to ordinary temperature (the cooling rate was 3.3° C./min) in 4 h to obtain the graphite anode material.

In this embodiment, the anode material includes primary particle artificial graphite and secondary particle artificial graphite, mainly is the secondary particle artificial graphite, and the data of pore volume, tap density and specific surface area of the anode material are shown in Table 1.

Embodiment 4

This Embodiment differs from Embodiment 1 in that, the temperature rise and fall curve used in step (4) is as follows: The temperature was increased to 1600° C. (the heating rate was 4.4° C./min) in 6 h, the temperature was increased to 3200° C. (the heating rate was 6.7° C./min) in 4 h, the temperature was held for 10 h, the temperature was reduced to 800° C. (the cooling rate was 0.2° C./min) in 200 h after the temperature was held, and then the temperature was reduced to ordinary temperature (the cooling rate was 3.3° C./min) in 4 h to obtain the graphite anode material.

In this embodiment, the anode material includes primary particle artificial graphite and secondary particle artificial graphite, mainly is the secondary particle artificial graphite, and the data of pore volume, tap density and specific surface area of the anode material are shown in Table 1.

Embodiment 5

This Embodiment differs from Embodiment 1 in that, the mass ratio of petroleum coke, pore-forming agent and binder in step (2) was 80:5:15.

In this embodiment, the anode material includes primary artificial graphite particles and secondary artificial graphite particles, mainly is the secondary artificial graphite particles, and the data of pore volume, tap density and specific surface area of the anode material are shown in Table 1.

Embodiment 6

This Embodiment differs from Embodiment 1 in that, the mass ratio of petroleum coke, pore-forming agent and binder in step (2) was 85:3:12.

In this embodiment, the anode material includes primary artificial graphite particles and secondary artificial graphite particles, mainly is the secondary artificial graphite particles, and the data of pore volume, tap density and specific surface area of the anode material are shown in Table 1.

Embodiment 7

This Embodiment differs from Embodiment 1 in that, the mass ratio of petroleum coke, pore-forming agent and binder in step (2) was 90:2:8.

In this embodiment, the anode material includes primary particle artificial graphite and secondary particle artificial graphite, mainly is the secondary particle artificial graphite, and the data of pore volume, tap density and specific surface area of the anode material are shown in Table 1.

Embodiment 8

This Embodiment differs from Embodiment 1 in that, the mass ratio of petroleum coke, pore-forming agent and binder in step (2) was 94:1:5.

Figure 1:
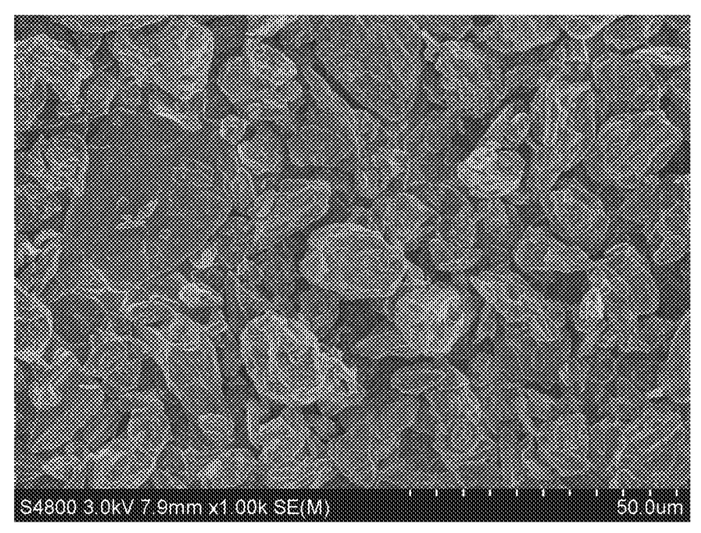
FIG. 1 is an SEM image of the anode material prepared in Embodiment 8 of the present disclosure at a magnification of 1000 times.

In this embodiment, the anode material includes primary particle artificial graphite and secondary particle artificial graphite, an SEM image of the anode material prepared in this embodiment is shown in FIG. 1, as can be seen in FIG. 1: artificial graphite has a small particle size and mainly is primary particle artificial graphite. The data of pore volume, tap density and specific surface area of the anode material are shown in Table 1.

Embodiment 9

This Embodiment differs from Embodiment 1 in that, D50 of the pore-forming agent in step (2) is 5 nm, (D90−D10)/D50=0.7.

The anode material includes primary particle artificial graphite and secondary particle artificial graphite, mainly is the secondary particle artificial graphite. The data of pore volume, tap density and specific surface area of the anode material are shown in Table 1.

Embodiment 10

This Embodiment differs from Embodiment 1 in that, D50 of the pore-forming agent in step (2) is 6 nm, (D90−D10)/D50=0.5.

The anode material includes primary particle artificial graphite and secondary particle artificial graphite, mainly is the secondary particle artificial graphite. The data of pore volume, tap density and specific surface area of the anode material are shown in Table 1.

Embodiment 11

This Embodiment differs from Embodiment 1 in that, the carbonization temperature in step (3) was 800° C.

The anode material includes primary particle artificial graphite and secondary particle artificial graphite, mainly is the secondary particle artificial graphite. The data of pore volume, tap density and specific surface area of the anode material are shown in Table 1.

Embodiment 12

This Embodiment differs from Embodiment 1 in that, the carbonization temperature in step (3) was 1100° C.

The anode material includes primary particle artificial graphite and secondary particle artificial graphite, mainly is the secondary particle artificial graphite. The data of pore volume, tap density and specific surface area of the anode material are shown in Table 1.

Comparative Example 1

This Embodiment differs from Embodiment 1 in that, the mass ratio of petroleum coke, pore-forming agent and binder in step (2) was 65:23:12.

Comparative Example 2

This Embodiment differs from Embodiment 1 in that, no pore-forming agent was added in step (2), and the mass ratio of petroleum coke to binder was 94:6.

Comparative Example 3

This Embodiment differs from Embodiment 1 in that, the particle size of the pore-forming agent in step (2) was D50=15 nm, (D90–D10)/D50=1.5.

Comparative Example 4

This Embodiment differs from Embodiment 1 in that, D50 of the pore-forming agent in step (2) is 3 nm, (D90–D10)/D50-0.4. Comparative Example 5

This Embodiment differs from Embodiment 1 in that, in step (4): The second precursor obtained in step (3) was graphitized at a high temperature of 3000° C., and the temperature rise and fall process curve was controlled as follows: The temperature was increased to 1800° C. (the heating rate was 1.76° C./min) in 17 h, the temperature was increased to 3000° C. (the heating rate was 3.3° C./min) in 6 h, the temperature was held for 6 h, and then the temperature was reduced to ordinary temperature (the cooling rate was 2.2° C./min).

Comparative Example 6

This Embodiment differs from Comparative Embodiment 1 in that, in step (4): The second precursor obtained in step (3) was graphitized at a high temperature of 3000° C., and the temperature rise and fall process curve was controlled as follows: The temperature was increased to 3000° C. (the heating rate was 3° C./min) in 17 h, the temperature was held for 6 h, and then the temperature was reduced to ordinary temperature (the cooling rate was 3° C./min).
Performance Testing (1) Method for testing median particle size of anode material:

the particle size distribution range of the anode material was tested by a Malvern Mastersizer.

(2) Method for testing pore volume and average pore diameter of anode material:

the test was carried out by using ASAP2460 device from American Micromeritics, and the pore volume V and the average pore diameter were calculated in the pore diameter range of 17 Å to 3000 Å by a model of BJH Desorption cumulative volume of pores model.

(3) Method for testing specific surface area of anode material:

the test was carried out by using JW-DX Surface Area Analyzer of Beijing JWGB Instrument Co., Ltd., and the unit is $m^2/g$.

(4) Method for testing tap density of anode material:

the tap density T was tested by particle size analyzers Dual Autotap of Anton Paar (Shanghai) Trading Co. Ltd., the tap density T is a value after 222 vibrations, and the unit is g/cc.

(5) The surface morphology and the like of the anode material were observed by a Hitachi S4800 scanning electron microscope.

(6) Method for testing battery performance: samples prepared in Embodiments 1 to 20 and Comparative Examples 1 to 2: samples in mass ratio of (CMC+SP):SBR=95:1.5:1.5:2 was magnetically stirred in deionized water for 8 h to uniformly mix. The mixed slurry was coated on copper foil and dried under vacuum at 60° C. as a working electrode. Metal lithium was used as a counter electrode and a reference electrode, the diaphragm was Celgard2325, the electrolyte was 1 mol·L−1LiPF6-EC (ethylene carbonate)/DMC (dimethyl carbonate)/EMC (methyl ethyl carbonate) (in volume ratio of 1:1:1), CR2016 button battery assembly was completed in a glove box filled with high purity argon, and four batteries were prepared for each group of samples.

The capacity and initial efficiency test was performed on the LAND battery tester, and the charging and discharging conditions were as follows: rest for 2 h; discharged: 0.1 C to 0.005V, 0.09 C, 0.08 C . . . 0.02 C to 0.001V; rest for 15 min; charged: 0.1 C to 1.5V; rest for 15 min.

The full charged expansion test of 20 cycles was measured by using a mold battery, the graphite negative electrode surface density was 70 $g/m^2$, the compaction density was 1.6 g/cc, the matching positive electrode is LCO, the surface density was 166 $g/m^2$, and the compaction density was 3.5 to 3.7 g/cc; the cycle test conditions were as follows: firstly charged and discharged at a rate of 0.1 C for one cycle, and then charged and discharged at a rate of 0.2 C for another cycle, finally charged and discharged at a rate of 0.5 C in the following 3rd to 20th cycles, and then the data of change of pole piece thickness was collected by the sensor in the cycle process corresponds to the cycle data collected by the electrochemical test cabinet to obtain the full data of charged expansion value of 20 cycles.

TABLE 1

Test results of the parameters of the anode materials of each embodiment and comparative example.

| Sample | V ($cm^3$/kg) | S ($m^2$/g) | T (g/cc) | V*S/T | D50 (μ) | D90 (μm) | D10 (μm) | (D90−D10)/D50 |
|---|---|---|---|---|---|---|---|---|
| S1 | 4.989 | 1.774 | 1.063 | 8.33 | 17.85 | 32.21 | 8.53 | 1.68 |
| S2 | 4.886 | 1.732 | 1.078 | 7.85 | 17.43 | 31.47 | 8.22 | 1.71 |
| S3 | 4.612 | 1.715 | 1.089 | 7.26 | 18.02 | 32.81 | 8.27 | 1.79 |
| S4 | 4.425 | 1.664 | 1.096 | 6.72 | 17.25 | 31.76 | 8.24 | 1.76 |
| S5 | 3.463 | 1.433 | 1.163 | 4.27 | 17.72 | 30.12 | 7.89 | 1.57 |

TABLE 1-continued

Test results of the parameters of the anode materials of each embodiment and comparative example.

| Sample | V (cm³/kg) | S (m²/g) | T (g/cc) | V*S/T | D50 (μ) | D90 (μm) | D10 (μm) | (D90-D10)/D50 |
|---|---|---|---|---|---|---|---|---|
| S6 | 3.477 | 1.399 | 1.1957 | 4.07 | 17.22 | 31.27 | 7.68 | 1.83 |
| S7 | 2.823 | 1.302 | 1.217 | 3.02 | 16.62 | 30.27 | 7.79 | 1.75 |
| S8 | 2.693 | 1.264 | 1.225 | 2.78 | 17.63 | 29.83 | 7.36 | 1.66 |
| S9 | 3.685 | 1.513 | 1.108 | 5.03 | 17.44 | 31.05 | 7.67 | 1.34 |
| S10 | 4.566 | 1.742 | 1.087 | 7.32 | 17.82 | 30.67 | 7.87 | 1.28 |
| S11 | 2.814 | 1.288 | 1.221 | 2.97 | 17.42 | 30.54 | 7.24 | 1.34 |
| S12 | 4.027 | 1.587 | 1.112 | 5.75 | 17.66 | 30.89 | 7.84 | 1.31 |
| D1 | 7.521 | 1.953 | 0.942 | 15.59 | 17.54 | 31.06 | 8.65 | 1.28 |
| D2 | 1.213 | 0.814 | 1.421 | 0.69 | 17.32 | 30.42 | 8.42 | 1.27 |
| D3 | 8.642 | 1.987 | 0.723 | 23.75 | 16.88 | 30.13 | 8.21 | 1.30 |
| D4 | 1.868 | 0.989 | 0.938 | 1.97 | 17.42 | 30.54 | 7.24 | 1.34 |
| D5 | 5.740 | 1.543 | 0.876 | 10.11 | 16.85 | 31.09 | 8.33 | 1.35 |
| D6 | 8.263 | 1.887 | 0.902 | 17.59 | 17.87 | 31.26 | 8.89 | 1.25 |

TABLE 2

Performance parameter measurement results of the anode materials of each embodiment and comparative example.

| Sample | Capacity (mAh/g) | Initial Efficiency (%) | 1 C./0.2 C. (%) | 2 C./0.2 C. (%) | Full charged expansion of 20 week cycle (%) |
|---|---|---|---|---|---|
| S1 | 354.8 | 94.2 | 65.7 | 26.8 | 18.6 |
| S2 | 354.4 | 95.1 | 63.5 | 23.5 | 18.2 |
| S3 | 355.1 | 94.6 | 64.2 | 24.3 | 17.7 |
| S4 | 355.2 | 95.2 | 64.4 | 24.1 | 17.9 |
| S5 | 356.2 | 94.9 | 65.2 | 26.8 | 17.9 |
| S6 | 357.8 | 95.5 | 66.1 | 26.5 | 17.3 |
| S7 | 359.3 | 95.6 | 66.3 | 27.5 | 16.8 |
| S8 | 360.2 | 95.5 | 64.9 | 26.5 | 17.3 |
| S9 | 355.9 | 94.8 | 64.6 | 25.8 | 17.4 |
| S10 | 356.9 | 94.4 | 65.7 | 26.1 | 18.1 |
| S11 | 357.3 | 95.1 | 65.5 | 25.9 | 18.2 |
| S12 | 355.5 | 93.9 | 66.4 | 27.1 | 18.8 |
| D1 | 355.4 | 92.5 | 62.2 | 21.7 | 20.3 |
| D2 | 359.8 | 94.8 | 58.8 | 18.2 | 17.4 |
| D3 | 353.3 | 91.1 | 62.4 | 21.2 | 19.1 |
| D4 | 359.5 | 91.7 | 61.2 | 20.8 | 19.8 |
| D5 | 342.8 | 90.2 | 61.7 | 19.8 | 17.6 |
| D6 | 340.4 | 89.5 | 60.2 | 19.3 | 16.3 |

As shown in Table 1 and Table 2, the present disclosure can reflect the overall distribution of defects such as pore pathways, lattices, interlayer microcracks and the like in the graphite particles through the ratio relationship between the specific surface area, the pore volume, the tap density of the anode material of the constructed anode material, within the limited range of 2≤V*S/T≤10, which indicates that when the anode material of the present disclosure is made into an electrode for use in a battery, the pore defects in the anode material are uniformly distributed, the uniformly distributed pore defects can reduce the expansion of the graphite anode material during charging and discharging, and the pores can serve as an additional lithium storage space to improve the lithium storage capacity of the anode material, and meanwhile, the specific surface area is increased within a certain range, so that when the anode material is made into an electrode for use in a battery, after the electrolyte is injected, the pores in the artificial graphite particles are filled with the electrolyte, and when charging and discharging are performed, an electrochemical reaction occurs in the electrode, the defects create more lithium ion diffusion pathways and electrochemical reaction interfaces for the anode material, the diffusion of lithium ions at the solid-liquid interface and in the solid phase can be promoted, the concentration polarization is reduced, and the capacity and the rate performance of the anode material are improved. In addition, the proper surface roughness also enables the anode material of the present disclosure to have good processability, which can prevent the graphite sheet layer from falling off during the cycle process of the graphite anode material, and is beneficial to improving the cycle performance of the material.

The added amount of the pore-forming agent in Comparative Example 1 is too much, which results in structure defects of the anode material, and the lower surface fluidity results in a lower tap density of the anode material, which finally results in poor processability of the anode material, which increases the difficulty of coating the pole piece and manufacturing the battery, and is also not conducive to maintaining the structural stability of the electrode plate in the cycle process, and is not conducive to improving the cycle performance of the material and the energy density of the battery.

No pore-forming agent was added in Comparative Example 2, resulting in insufficient pore structure of the anode material, and the limited diffusion pathway would limit the diffusion of lithium ions at the solid-liquid interface and in the solid phase, further limiting the development of the high-rate charge/discharge performance of graphite.

The particle size of the pore-forming agent used in Comparative Example 3 does not meet the limited range of the present disclosure, resulting in an excessively large pore size of the prepared anode material, uneven distribution of pore defects of the graphite material, and a low tap density of the anode material, and finally resulting in poor processability of the anode material, which increases difficulty for coating an pole piece and manufacturing a battery, and is also not conducive to maintaining structural stability of the pole piece in a cycle process, and is not conducive to improving cycle performance of the material and energy density of the battery.

The median particle size of the pore-forming agent used in Comparative Example 4 is smaller than the limited range of the present disclosure, so that the pore size and pore volume of the prepared artificial graphite are too small, and the limited diffusion pathway can limit the diffusion of lithium ions at the solid-liquid interface and in the solid phase, further limiting the play of the high-rate charge/discharge performance of graphite.

The parameters of the graphitization treatment and/or the addition ratio of the pore-forming agent in Comparative Example 5 and Comparative Example 6 are not within the limited range of the present disclosure, although the pore volume V, the specific surface area S and the tap density T of the finally prepared anode material are respectively within the range of the embodiment of the present disclosure, the value of V*S/T does not satisfy 2 to 10, so that the rate performance, the initial efficiency and the cycle performance of the anode material are all worse than those of the anode material prepared in the embodiment of the present disclosure.

For those skilled in the art, the present disclosure may be subject to various modifications and changes. Any modification, equivalent replacement, improvement, and the like made within the spirit and principles of the present disclosure shall fall within the protection scope of the present disclosure.

What is claimed is:

1. An anode material, comprising graphite, wherein
   an interior and/or a surface of the graphite has pores, and a pore volume V cm$^3$/kg, a specific surface area S m$^2$/g, and a tap density T g/cc of the anode material satisfy: 2≤V*S/T≤10; and
   the pore volume is tested by ASAP2460 device from American Micromeritics, and calculated in a pore size range of 17 Å to 3000 Å by a model of BJH Desortation cumulative volume of pores;
   wherein the specific surface area is tested by JW-DX Surface Area Analyzer of Beijing JWGB Instrument Co., Ltd.;
   wherein the graphite is artificial graphite primary particles and/or artificial graphite secondary particles.

2. The anode material according to claim 1, wherein a particle size of the anode material satisfies: 0.9≤(D90−D10)/D50≤1.8, and 10 μm≤D50≤20 μm.

3. The anode material according to claim 2, wherein the anode material comprises at least one of the following features (1) to (2):
   (1) D90 of the anode material ranges from 25 μm to 36 μm;
   (2) D10 of the anode material ranges from 7 μm to 9 μm.

4. The anode material according to claim 1, wherein a pore volume of the anode material ranges from 2 cm$^3$/kg to 6 cm$^3$/kg.

5. The anode material according to claim 1, wherein the anode material has a specific surface area of 1.0 m$^2$/g to 2.0 m$^2$/g.

6. The anode material according to claim 1, wherein the anode material has a tap density of 0.85 g/cc to 1.40 g/cc.

7. The anode material according to claim 1, wherein the pores comprise at least one of micro-pores and meso-pores.

8. The anode material according to claim 1, wherein an average pore diameter of the pores ranges from 80 Å to 125 Å.

9. A battery, comprising an anode material according to claim 1.

* * * * *